Patented Oct. 12, 1943

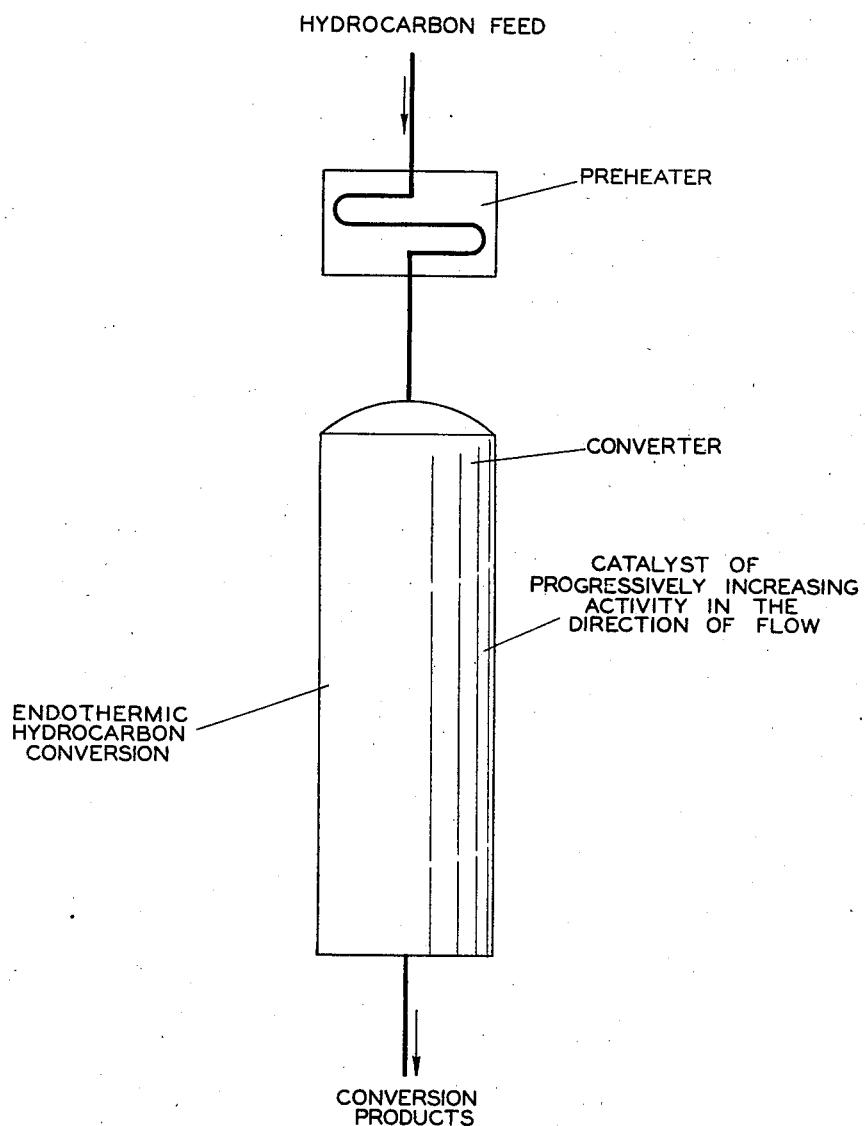

2,331,427

UNITED STATES PATENT OFFICE 2,331,427

CONTROL OF CATALYTIC REACTIONS

Walter A. Schulze, Graham H. Short, and Carl J. Helmers, Bartlesville, Okla., assignors to Phillips Petroleum Company, a corporation of Delaware Application June 28, 1939, Serial No. 281,754

4 Claims. (Cl. 196—52)

This invention relates to catalytic processes involving endothermic conversion reactions effected by means of solid contact catalyst masses. More specifically, this invention relates to a novel method of control of the convertive reactions whereby the extent of conversion is regulated to conform to the variations of operating conditions encountered in said processes.

Without being limited thereto, this invention has particular application to those conversion processes which include the convedsion, dehydrogenation, reformation and molecular rearrangement of hydrocarbon fluids by the catalytic action of solid contact masses. In such processes, control of the convertive reactions is of extreme value, due to the complex nature of the raw materials which introduces the possibility of a variety of undesirable side reactions with resulting uneconomic losses of raw material and product.

In the aforementioned conversion processes, the conventional procedure is to pass the raw material at predetermined flow rate in liquid or in vapor phase (depending on the temperature and the pressure) through a bed of suitable solid catalyst, both reactants and catalyst being heated by suitable means to the desired temperature of operation. Pressures in such a process are usually constant and are maintained at low values which favor the course of the desired reactions, while the volume through-put is ordinarily limited by plant design and requirements. The amount of conversion to be obtained by one-pass operation will depend on the velocity or rate of convertive reaction and on the time of reaction or the time of contact of reactants with the catalytic surfaces of the contact mass.

The activity of a catalyst for a definite conversion is usually of economic significance only within a fairly narrow temperature range, and a conversion process using that catalyst must evidently be operated within the active range. This condition is reflected by the tremendous change in the degree of conversion obtained in a process with relatively small temperature changes.

We have found that the extent of conversion per unit time or in other words the convertive reaction velocity depends on (1) the concentration of reactants (2) the pressure (3) the temperature and (4) the effective catalyst surface per unit volume of the contact mass. When we limit the first two of these factors according to plant design and the nature of the convertive reactions, we find that the reaction velocity is determined by the temperature and the unit concentration of active catalyst. Thus the temperature in a co-active manner determines both the cata.yst activity and the reaction velocity; and the remaining factor controlling conversion according to our mode of operation is the contact time which we define in terms of the active catalytic surface per unit volume of the catalyst bed.

When we operate to obtain a predetermined degree of conversion at one pass in a process of the type described, we find it necessary to control the reaction velocity by maintaining the temperature and contact time constant, or, if this is not practical, to cause these two factors to maintain a constant relationship by the practice of our invention. In operating we find that maintaining a constant temperature is hindered by the endothermic nature of said conversion. This quality of heat absorption in an amount depending on the extent of conversion results in a lowering of the temperature of the catalyst bed and hence of the reactants within the bed, even though both are heated to the desired temperature before the reaction is started. We have discovered that we are able to compensate for a downward temperature gradient within the catalyst bed which may amount to as much as 100° F. or more by means of our invention, and in so doing we can maintain the desired degree of conversion and obtain a satisfactory product.

Heretofore, suggested methods for the control of endothermic catalytic conversions have taken the form of complicated apparatus designs which by various expedients have attempted to solve the problems of heat transfer from a heating medium to the inner portion of an adsorbent catalyst wherein heat is being abstracted. For example, the arrangement of a catalyst in tubes of small cross section, said tubes being suspended in bundles in a heating medium has been suggested, or the disposition of catalyst in a bed with means of circulating a heating medium in an enclosed system throughout the bed has been proposed. No such method has effectively compensated for the low thermal conductivity of catalyst masses or has eliminated skin cracking along the surfaces of the metal elements of high thermal conductivity within such an apparatus.

Some proposed operations have included the preliminary superheating of reactants above optimum conversion temperature to offset endothermal heat loss. Such an expedient is uneconomic since increased losses of raw material through degradation reactions result, and the life of the catalyst is shortened by coke deposits. Also such superheating results in an over-use and deterioration of the initial increment of the catalyst bed and exposes a high concentration of conversion products to side reactions such as polymerization in traversing the remainder of the bed.

The object of our invention in the terms of the foregoing description is to provide a means of control which balances operating temperature against reaction time and to provide a constant reaction velocity.

The accompanying drawing, which is self-explanatory, illustrates diagrammatically an arrangement of equipment which may be employed for carrying out the present invention.

We have discovered satisfactory conversion at constant reaction velocity can be obtained in spite of falling temperature due to endothermal heat loss by controlling the extent of conversion per unit of time. Our technique of control recognizes the difficulty of maintaining constant temperature throughout the catalyst bed and the lack of any feasible method of mechanically altering the contact time of reactants with the catalyst mass at a constant flow rate. Instead our invention provides a constant relationship between temperature and contact time and thus provides constant reaction velocity. To do this we control the volume of active catalytic surface within a unit volume of the catalyst mass. Operation according to our invention now to be described in detail avoids the difficulties of control previously mentioned and furnishes a degree of flexibility unobtainable heretofore.

Our invention comprises heating the charge stock and the contact mass to a temperature high enough to insure satisfactory catalyst activity, but not high enough to cause excessive losses of raw material or product. The raw material is then passed through the catalyst bed at a constant volume flow rate (based on liquid feed) calculated to restrain degradation reactions and still provide the desired degree of conversion at one pass. The catalyst bed, however, does not contain solely the active catalytic material able to induce and support the conversion reactions. Incorporated therein is a controlled percentage of inert material which is incapable of inducing or supporting the conversion reactions in such a manner that the concentration of active catalytic surface per unit volume of the bed is regulated according to the requirements for constant reaction velocity.

Thus, to compensate for the heat loss accompanying conversion in the catalyst bed, we provide an increasing concentration of active catalyst per unit volume of the bed so that the effective contact of reactants with active material is varied inversely with the temperature, being shortest where the catalyst temperature is highest and longest in the increments of the catalyst bed at lowest temperature.

In preparing our bed of variable concentration catalyst, we arrange to have a low concentration of active ingredient at the point where reactants enter the bed. Thus, where the temperature is highest and catalytic activity is greatest, we can control the reaction velocity to a value that is satisfactory but not excessive because the effective contact time is short. This arrangement also permits us to introduce reactants at a temperature somewhat higher than would be feasible with undiluted catalyst, if we so desire. Thus, the initial increments of the catalyst are protected against poisoning and coking, and uniform conversion throughout the bed is promoted with resultant longer life for the catalyst.

As the convertive reactions are accompanied by progressively lower temperatures during passage of reactants through the catalyst bed, we maintain the desired reaction velocity by providing a progressively increasing concentration of active catalytic ingredient in the bed. For example, we may have as low as 5 or 10 per cent of active catalyst in the initial increments of the bed and up to 100 per cent of active material in the increments of the bed adjacent to the exit port, for there the temperature reaches a minimum. In this manner it is possible to obtain the highest concentration of reaction products, such as unsaturates, as the reactants leave the catalyst bed and losses due to side reactions are minimized while an excellent product is received. By this described mode of operation, we obtain a degree of control hitherto not possible in plant operation of the aforementioned catalytic processes.

Other and similar applications of our invention will be obvious to those familiar with the art. For instance, the arrangement or concentration of active catalyst in the contact mass may be varied to best conform to the temperature requirements of any catalytic process wherein the reaction velocity is to be controlled or maintained constant. As a means of control, this invention is general in scope and requires only obvious modification to fit it to a particular process wherein controlled heat transfer within a medium of low thermal conductivity is a factor.

As will be evident from the foregoing description, we effectively vary the time of contact of a reactant with a catalyst by varying the concentration of active catalytic material per unit volume of the catalyst bed. The materials which we term inert are classified on a comparative basis since such materials may have catalytic activity under certain other conditions. For example, under one set of operating conditions, fuller's earth may be relatively inert and adapted to incorporation with bauxite as the active ingredient, whereas under certain other conditions bauxite may be relatively inert and suitable for mixing with bauxite impregnated with a metal oxide—a typical promoted catalyst. Thus those materials we choose as inert ingredients are those which under the conditions of use have catalytic activity inferior to that of our active components and are substantially inert toward the reactants.

The following descriptive example of an application of our invention will serve to illustrate its utility in general terms, but said example should not be construed as a limitation thereof.

A catalytic dehydrogenation process may be operated by passing the vapors of a hydrocarbon oil over a contact catalyst of the bauxite type at a temperature of 1020° F. The catalyst bed may be a tower 10 feet high and 3 feet in diameter. At the temperature of operation, in order to avoid losses by cracking, a flow rate of 3 liquid volumes of charge per hour per volume of catalyst may be employed. However, under these operating conditions, incomplete conversion results at one pass due to the temperature gradient of from 1020 to 930° F. from entry to exit of the catalyst tower. Superheating the raw charge to 1100° F. may result in a higher exit temperature but also causes as high as 20 per cent gas losses due to degradation reactions which also poison the catalyst. A reduction of liquid through-put at the original temperature similarly results in higher gas losses due to over-conversion, and a lower exit temperature is encountered.

This process may be entirely satisfactory when the concentration of active catalyst is varied by our invention. The top 3 feet of the bed may be filled with material composed of 10 per cent active and 90 per cent inert material; the next 3 feet of the bed may contain 20 per cent active and 80 per cent inactive material; the next 2 feet of the bed may contain 50 per cent of active catalyst; finally, the last 2 feet of the bed adjacent to the exit port may contain 100 per cent of active catalyst. With this arrangement of the contact mass, the reactants may enter the bed at 1020° F., pass the mid-point of the catalyst tower at about 1000° F., and exit at 900° F. with a high yield of satisfactory product, a suitable hydrogen to methane ratio and low fixed gas loss. The catalyst life with this arrangement may be at least three times as long as in the initially described operation. The inert material used in this instance to dilute the active catalyst may be a type of clay known to be substantially inactive in this process at the operating temperatures and conditions.

As examples of the preparation of our diluted catalysts may be listed bauxite, bauxite impregnated with metal salts, active clay-type minerals, mineral ores, metal and metal salt catalysts which may be diluted or disposed in increments of controlled concentration by incorporating with the requisite volume of substantially inactive materials such as pumice, asbestos, crushed firebrick and the inactive silicates, oxides and natural clays.

The number of increments of fixed concentration so prepared is not limited, and by preparing a sufficient number of increments of small percentage variations, a catalyst bed of very gradual and uniform gradation can be obtained. As an extreme, one hundred increments would cover the entire composition range in steps of 1 per cent. The increments may be prepared in separate chambers arranged suitably in series, or fixed in place in a single large chamber by suitable supports and separators. The catalyst bed so prepared may be regenerated in situ when necessary without disarranging or mixing of the increments containing different concentrations of active catalysts. The particular arrangement of the catalyst may also be of aid in controlling the exothermic heat of regeneration.

Our principle may even be applied to the impregnation of carrier materials with active catalysts or to the application of promoters to catalyst masses. In preparing impregnated catalysts, the amount of impregnator applied is controlled to result in a varied and controlled concentration on the carrier or catalyst support. Similarly the disposition of promoter in a catalyst mass may be such as to conform to any desired concentration per unit volume of the mass.

The materials to be mixed should be of comparable particle size so that the mixture offers the same resistance to flow of reactants, as the active catalyst alone. The choice of catalyst and diluent will of course depend on the conversion process in which the catalyst is to be employed.

The temperatures to be used in connection with the practice of our invention are those already known as necessary to any given catalytic conversion process; likewise the pressures to be used may be those known as favoring the desired convertive reactions. Appropriate reaction conditions are evidently a matter of economic selection, well within the general scope of the art to which our invention applies.

The foregoing specification and examples have disclosed and illustrated our invention, but since it is of generally wide application, neither is to be construed as imposing limitations on the scope of the invention. Specific application of our invention to hydrocarbon fluids includes the catalytic conversion of hydrocarbon distillates from any source as well as crude petroleum itself and light gases associated with such fluids.

We claim:

1. In the endothermic conversion of hydrocarbons by a one-pass operation at substantially constant feed rate over a contact catalyst wherein a decreasing temperature gradient exists within the catalyst bed in the direction of flow, the step of maintaining a controlled reaction velocity within the catalyst bed by varying the volume of active catalyst per unit volume of the bed by admixture with the material which is substantially inert under conversion conditions to produce in successive increments measured in the direction of hydrocarbon flow an increasing concentration of active catalyst, so that the effective reaction time is substantially inversely proportional to the prevailing temperature at any point within the bed.

2. A process for the endothermic catalytic conversion of hydrocarbons which comprises heating the charging stock, feeding the charge in vapor phase at a substantially constant flow rate and pressure to, a heated catalyst mass, and maintaining a controlled reaction velocity in the catalyst mass by the incorporation therein of regulated proportions of a material which is substantially catalytically inert under conversion conditions in such a manner as to obtain an increasing concentration of active catalyst in the mass in the direction of flow of the reactant whereby the effective active catalyst surface per unit volume of contact mass is varied inversely with the prevailing temperature at any corresponding point throughout the catalyst bed.

3. A process for the catalytic dehydrogenation of hydrocarbon oils which comprises flowing said hydrocarbons in vapor form through a bed containing a contact catalyst of the bauxite type admixed with inert material, the temperature of said hydrocarbon vapors on entering the bed being sufficient to initiate said dehydrogenation but decreasing on passage through the bed due to the endothermic nature of the reaction, and maintaining the reaction velocity constant, despite said decreasing temperature, by arranging said catalyst bed with the relative proportions of bauxite to inert material increasing progressively in the direction of the hydrocarbon flow, said increase being in inverse proportion to said temperature decrease.

4. The process of carrying out a catalytic endothermic hydrocarbon conversion by passage at a substantially constant flow rate over a body of contact catalyst wherein a downward temperature gradient exists through said catalyst body in the direction of flow of said hydrocarbons, which comprises arranging a body of unspent catalyst with progressively increasing catalytic activity for said hydrocarbon conversion from the initial to the final point of said body by forming said body of successive increments of changing composition such as to produce a progressively higher catalytic activity in said successive increments, heating the feed to a temperature sufficient to initiate said conversion, passing the so heated feed at a substantially constant flow rate into contact with said body of catalyst so arranged by introducing said feed at said initial point, passing through said body of catalyst and withdrawing the converted hydrocarbons at said final point, maintaining throughout the conversion a downward temperature gradient through said catalyst body in the direction of flow by allowing absorption of heat by the conversion reaction, and so adjusting said increasing activity of said catalyst body that the reaction continues at a substantially constant velocity throughout the body of catalyst despite said temperature gradient.

WALTER A. SCHULZE.
GRAHAM H. SHORT.
CARL J. HELMERS.